April 22, 1952 J. P. KINZER 2,593,463

FREQUENCY STABILIZED MICROWAVE OSCILLATOR

Filed June 21, 1946 2 SHEETS—SHEET 1

INVENTOR
J. P. KINZER
BY E. V. Griggs
ATTORNEY

April 22, 1952 J. P. KINZER 2,593,463

FREQUENCY STABILIZED MICROWAVE OSCILLATOR

Filed June 21, 1946 2 SHEETS—SHEET 2

INVENTOR
J. P. KINZER
BY E. V. Griggs
ATTORNEY

Patented Apr. 22, 1952

2,593,463

UNITED STATES PATENT OFFICE 2,593,463

FREQUENCY STABILIZED MICROWAVE OSCILLATOR

John P. Kinzer, Ridgefield, N. J., assignor to Bell Telephone Laboratories, Incorporated, New York, N. Y., a corporation of New York Application June 21, 1946, Serial No. 678,212

7 Claims. (Cl. 250—36)

This invention relates to frequency-stabilized microwave oscillators.

An object of the invention is to improve the frequency control of microwave oscillators.

Another object is to stabilize the frequency of repeller type microwave oscillators.

One type of continuous microwave oscillator which is finding relatively wide use is the so-called repeller type oscillator described by J. R. Pierce in the proceedings of the I. R. E., February 1945, vol. 33, No. 2, page 112, and illustrated schematically in Fig. 3 on page 113. For some applications, oscillators of that type do not have adequate frequency stability.

In accordance with the present invention, a system of resonant cavities is associated with the output of a repeller oscillator. The individual outputs of the resonators are rectified and the resulting rectified currents are combined in opposition to provide a frequency control bias potential for the oscillator which serves to control the repeller voltage in such manner as to counteract frequency variation.

In the drawing Fig. 1 illustrates in schematic diagram one embodiment of the invention in a system for stabilizing the frequency of a repeller oscillator;

Figure 1:
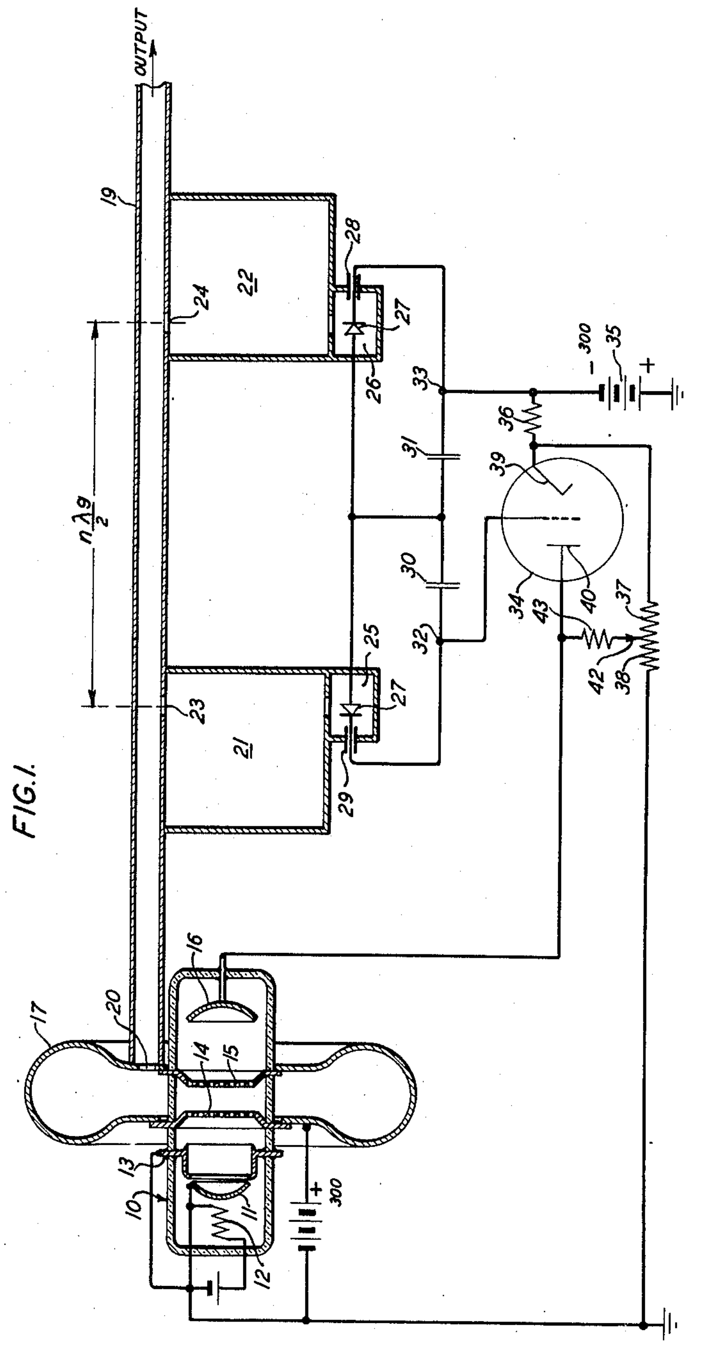

Referring to the drawing there is shown in Fig. 1 an electron discharge device 10 having a cathode 11, cathode heater 12, collimator 13, a pair of high potential screens 14 and 15 and a repeller electrode 16. The screens are supported by disc-shaped annuli passing entirely through the dielectric wall of the tube 10 and terminating in outwardly extending flanges against which the inner margins of the toroidal cavity resonator structure 17 are seated. With the screens and the repeller polarized as illustrated, the device operates as a repeller oscillator to produce oscillations of a frequency determined primarily by the configuration of the resonator structure 17, the velocity of the electrons in passing across the gap between the screens 14 and 15 and the transit time elapsing between emergence from that gap by an outgoing electron and its return to the gap from the region of the repeller. That transit time is a function of the velocity with which the electrons emerge from the plane of grid 15 in their course toward the repeller 16 and of the potential difference between the grid 15 and the repeller 16. Consequently, variation of that potential difference affects the frequency of the oscillations produced by the oscillator.

The oscillations produced by the oscillator build up an oscillation field within the resonator 17. Oscillation energy is supplied by the resonator 17 through an aperture or orifice coupler 20 to an output wave guide 19 having tubular conducting boundaries. A system for stabilizing the frequency of the oscillations supplied to the wave guide includes as its initial elements two sharply selective chamber resonators 21 and 22 connected to the wave guide by aperture couplings 23 and 24 which are spaced apart a distance of $$\frac{n\lambda_g}{2}$$

where $n$ represents any integer and $\lambda_g$ is the wavelength at the stabilized frequency of the microwaves as measured along the guide. Resonator 21 is tuned to a frequency slightly lower than the stabilized frequency; resonator 22 to a frequency slightly higher. The resonators 21 and 22 which constitute the selective portion of a microwave discriminator are provided with output chambers 25 and 26 to which they are respectively coupled by orifices and each output chamber encloses a microwave detector 27 with its pickup connections. The detectors may be of any preferred type but are preferably point contact rectifying detectors of the highly efficient silicon type. The detectors have output paths for low frequency detected currents which pass through the insulated leads with their surrounding concentric by-pass capacitors 28, 29. The output paths are connected to two condensers 30 and 31 in series-opposing relationship to produce between the points 32 and 33 a unidirectional potential, the polarity of which depends upon which of the two resonators 21 and 22 is more nearly in tune with the microwaves in wave guide 19 so as to receive a predominant share of its energy. The magnitude of the unidirectional potential depends upon the difference in magnitude of the individual unidirectional potentials across the capacitors 30 and 31.

The net unidirectional potential between points 32 and 33 is applied to the grid cathode circuit of a direct current amplifier 34. As illustrated, a source 35 of, for example, 300 volts electromotive force, supplies current through a series path including resistors 36, 37 and 38. The potential difference across resistor 37 is effective to produce space current between cathode 39 and anode 40 of the direct current amplifier, its magnitude being controllable by variation of the position of the potentiometer contact 42. Variations in the applied unidirectional grid electromotive force will cause corresponding variations in the space current of the direct current amplifier 34. These variations in the current cause similar variations in the potential drop across the load resistance 43. The net electromotive force applied to the repeller 16 is the difference of the potential drop across arm 38 of the potentiometer 42 and that across load resistance 43. Thus variations in the potential of the grid of amplifier 34 will result in amplified variations in the electromotive force impressed on repeller 16. The function of potentiometer 42 is to adjust the repeller potential to an optimum value for the condition of no potential difference between 32 and 33. In this condition normal bias is applied to the grid of tube 34 by virtue of the potential drop in the bias resistor 36.

The coupling apertures 23 and 24 of the wave guide 19 should be placed at points which, while an integral number of half-wavelengths apart, are not too widely separated in order to preclude differences in field strength or casual phase variation or other effects which may not be readily balanced out. In other words, the relative locations of these apertures should be such that changes in the standing waves in the wave guide will affect both cavities 21 and 22 in identical fashion.

Figure 2:
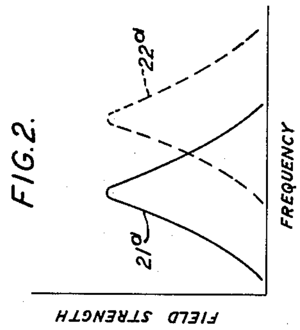
Fig. 2 is a graph showing the selectivity of the discriminator used in Fig. 1.

It will be apparent that as the frequency of the microwaves supplied by the repeller oscillator to guide 19 varies the resonators 21 and 22 will have responses which may be represented by the solid and broken line curves 21*a* and 22*a* of Fig. 2. The direct current electromotive force between 32 and 33 is determined by the difference of the two responses. The unidirectional potential across resistor 43 and the potential of the repeller electrode 16 as well will vary in magnitude and polarity as has been explained. As the oscillation frequency tends to fall below the desired frequency, the potential difference across resistor 43 will vary in such a direction as to cause the repeller potential to tend to increase the frequency. An opposite effect is had when the frequency of the oscillations supplied to wave guide 19 tends to rise above the desired frequency. Consequently, the repeller oscillator is highly stabilized with respect to frequency.

Figures 3, 4, 5:
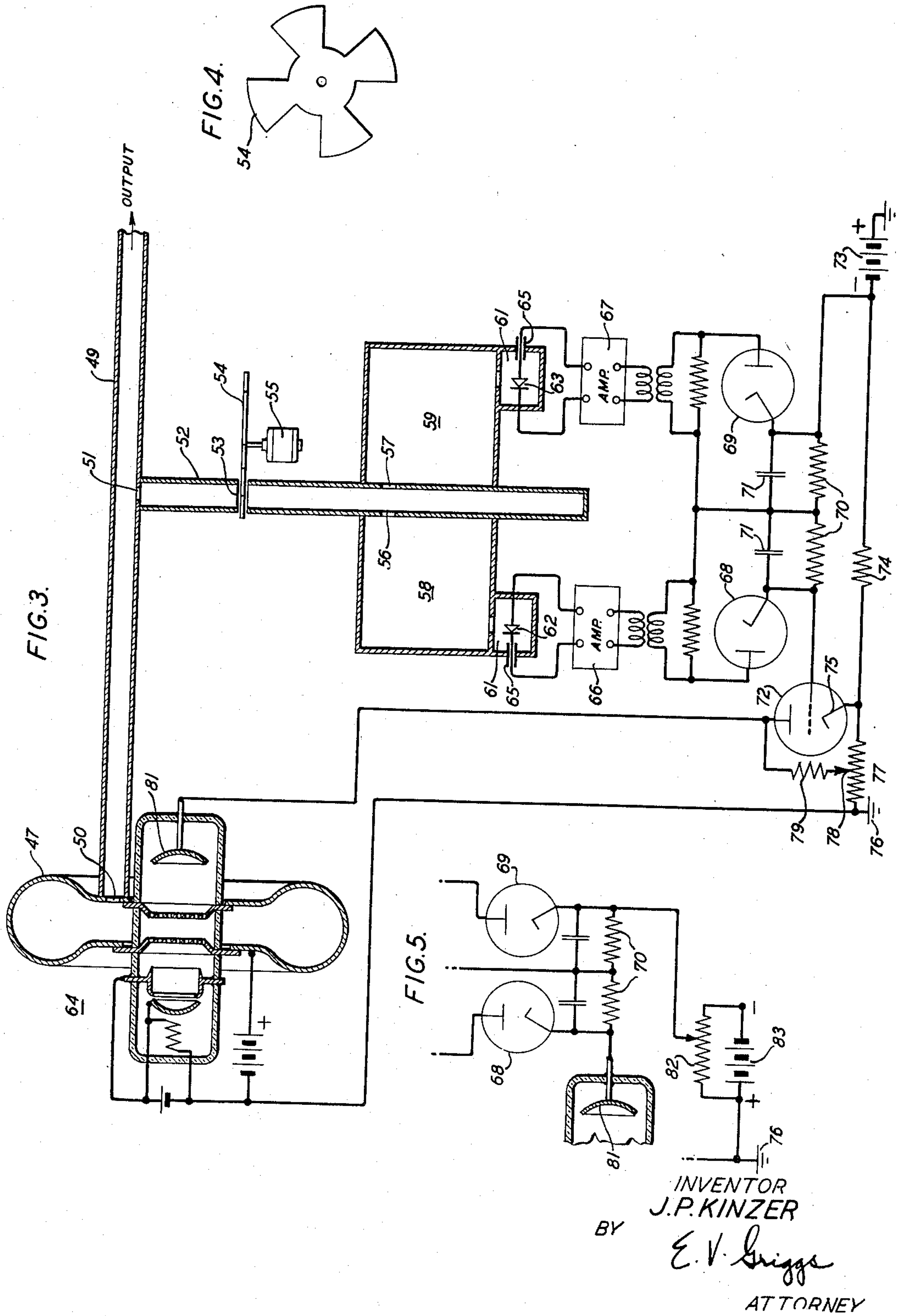
Fig. 3 is a schematic diagram of a modification of the system of Fig. 1.
Fig. 4 shows a detail of the system of Fig. 3.
Fig. 5 shows a modification of the system of Fig. 3.

The system of Fig. 3 differs from that of Fig. 1 in the connections and circuits of the discriminator. In this modified system the resonator 47 of the repeller oscillator is coupled to a tubular microwave output guide 49 through a coupling orifice 50. At a point 51 a wave guide stub section 52 is coupled to the wave guide 49 by an aperture 51. A transverse slot 53 is provided in the stub 52 and a rotating switch or chopper 54 driven by continuously operating motor 55 is positioned to extend through the slot to periodically interrupt the transmission. This enables the oscillation energy in the section 52 to be interrupted or modulated at a definite frequency. Coupled to the wave guide section 52 by oppositely positioned apertures 56 and 57 are the selective closed chamber resonators 58 and 59 responsive respectively to oscillations of a frequency slightly below and a frequency slightly above the desired frequency of the oscillations supplied to the guide 49. Apertures 56 and 57 should be located at a point $$\frac{n\lambda_g}{2}$$

from the short-circuited end of the stub wave guide section where $n$ is any integer. Coupled to the resonators 58 and 59 respectively by aperture couplings are the small chambers 60 and 61 enclosing rectifying detectors 62 and 63 with their electrical pickup connections. Each of these detectors receives from its associated resonator oscillations of an intensity which varies as the frequency of the oscillations supplied by the repeller oscillator 64 approaches or recedes from the principal response frequency of the respective resonator. The rectifying detectors 62 and 63 are each provided with output circuits which lead through the concentric by-pass capacitor 65 to amplifiers 66 and 67, respectively by which the detected oscillations of the frequency determined by the rotating interrupter 54 are amplified. By virtue of the use of the chopper 54, the output of the microwave detectors 62, 63 is an interrupted direct current. The frequency of these interruptions is very much lower than that of the microwaves and may be as low as a few hundred cycles or even lower. Consequently the amplifiers 66 and 67 need amplify only these low frequency variations thus permitting high gains to be obtained. Thus increased sensitivity to changes in the microwave frequency is secured. After amplification by the amplifiers 66 and 67, the detected frequency oscillations are impressed upon rectifiers 68 and 69 respectively, the outputs of which are connected in series opposition to segments of the resistor 70 across the terminals of which the rectified charge storing capacity elements 71 are connected. The resistor 70 is connected in the grid cathode path of a unidirectional current amplifier 72. A local source 73 of unidirectional current has a negative terminal connected through resistor 74 to the cathode 75 of the amplifier 72 and its positive terminal connected to ground. The cathode 75 is also connected to ground at 76 through a potentiometer resistor 77 with which is associated the variable contactor 78 of a resistor 79 connected to the anode of the amplifier 72. The local source 73 accordingly supplies current to the series path including resistors 77 and 74 and causes the potential of the potentiometer tap 78 to be sufficiently above that of the cathode 75 to tend to initiate space current through the amplifier 72. The magnitude of the space current in the absence of other controlling factors is determined by the difference between the potentials across resistors 70 and 74 in the grid bias circuit. As the space current of the unidirectional current amplifier 72 rises or falls the potential difference across the resistor 79 will likewise rise or fall. The repeller electrode 81 of oscillator 64 is connected to the anode of the amplifier 72. Consequently, the potential of the repeller 81 with reference to the cathode of the oscillator 64 will depend upon the algebraic sum of the potential drop across the resistor 79 and the drop in that portion of potentiometer resistor 77 between the contactor 78 and ground 76. It transpires therefore that when the frequency of the oscillations in wave guide 49 increases thus increasing the field intensity within the resonator 59 and the rectified output voltage of rectifier 69 that voltage will tend to predominate over the opposing voltage from the rectifier 68 and will accordingly vary the potential on the grid of amplifier 72 in such direction that the ensuing potential on repeller electrode 81 will tend to reduce the frequency of the oscillations produced by oscillator 64. Whenever, on the other hand, the frequency of oscillations supplied to the wave guide 49 falls, the intensity of oscillation in the resonator 58 will rise as will the rectified output voltage of the rectifier 68. Accordingly, the voltage from rectifier 68 will tend to overcome the opposing voltage from rectifier 69 driving the grid potential of amplifier 72 in the opposite direction so as to cause the potential of repeller electrode 81 to change in a direction to increase the frequency of the oscillations produced by oscillator 64. It will be apparent, therefore, that the system tends to maintain the frequency of the oscillations produced by the oscillator 64 highly constant.

Fig. 5 illustrates a modification of the circuit of Fig. 3 in which advantage is taken of the high gain secured by the interruption frequency amplifiers to eliminate the unidirectional current amplifier. In this modification the potential of the repeller electrode 81 is obtained directly from the resistors 70 in series with a portion of a potentiometer 82 connected across a unidirectional current source 83. The optimum potential for the repeller under condition of zero potential difference across resistor 70 may be had by appropriate setting of the potentiometer contactor. In this circuit the higher tuned resonator should be associated with rectifier 68 and the lower tuned with rectifier 69 because of the 180-degree phase change occasioned by omission of the unidirectional current amplifier.

What is claimed is:

1. In combination, a reflected electron beam oscillator comprising an electron tube having an oscillation output path and a reflection electrode, a pair of cavity resonators having frequencies above and below a desired oscillation frequency and coupled to the output path at points separated by an integral number of half-wavelengths at the desired frequency, means differentially connected to said resonators for deriving therefrom a resultant energy dependent upon the frequency of the oscillations impressed upon said output path and means connected to said differentially connected means and to the reflection electrode for applying to the reflection electrode a frequency control potential which varies with said resultant energy.

2. A microwave oscillator for producing oscillations of a desired frequency having a frequency control member, an electrically long hollow wave guide to which the oscillator is connected to supply oscillations thereto, a pair of frequency selective devices responsive respectively to frequencies above and below the desired frequencies connected to the hollow guide at points which are electrically separated but which are in phase agreement for oscillations of the desired frequency and means differentially responsive to the selective devices connected to the frequency control member for causing said frequency control member to correct the frequency of the oscillator.

3. An oscillator for producing high frequency electrical oscillations of the desired frequency, said oscillator including frequency control means and having an output circuit, a wave guide connected to said output circuit, a pair of selective devices responding respectively to oscillations of frequencies above and below the desired frequency, said selective devices being coupled to the wave guide at points separated by an integral number of half-wavelengths, a detector connected to each selective device and electrical connections between the detectors and the frequency control means to enable the detectors to jointly control the frequency of the oscillations produced.

4. The structure of claim 2, and a branch transmission line connected at one end to said system, said selective devices being coupled to said branch line at a distance from its other end equal to $$\frac{n\lambda_g}{2}$$

where $n$ is an integer and $\lambda_g$ is the wavelength in the branch line.

5. A frequency stabilization system for microwaves comprising an electron stream excited oscillator having a repeller electrode and a cavity resonator coupled to said stream, an output wave-guide transmission line coupled to said resonator, a short-circuited stub wave guide transversely coupled to said output guide, modulating means movable in said stub guide for producing periodic variations in the microwave energy in said stub guide, a pair of hollow cavity resonators coupled through apertures to said stub at maximum voltage points located $$\frac{n\lambda_g}{2}$$

from the short-circuited portion, where $n$ is an integer and $\lambda_g$ is the wavelength in the wave-guide line, said resonators being respectively tuned to frequencies above and below the desired frequency, detectors coupled respectively to said resonators for deriving the modulation frequency and means for rectifying the detected currents in phase opposition to provide an unidirectional control voltage, and means for applying said control voltage to said repeller electrode to provide a stabilized frequency of oscillation.

6. A frequency stabilization system for microwaves comprising an electron stream excited oscillator having a hollow cavity resonator coupled to said electron stream, said oscillator having a frequency controlling electrode, a wave-guide transmission line coupled to said oscillator and having a short-circuited branching wave-guide stub connected thereto, a cyclically variable modulating element movable in said wave-guide stub, a pair of cavity resonators tuned to frequencies above and below said stabilization frequency and connected to said wave-guide stub at high voltage points which are cophasally excited, detectors respectively connected to said resonators, rectifiers connected to said detectors and an amplifier for providing direct-current control voltage corresponding to said cyclic modulations, and means for applying said control voltage to said electrode to provide a stabilized frequency of oscillation.

7. A frequency stabilizer system for microwaves comprising an electron stream excited oscillator having a cavity resonator of high Q coupled to said electron stream and having a repeller anode, an output wave-guide transmission line coupled to said resonator, a pair of high Q cavity resonators aperture-coupled to said line at points of voltage cophasally excited, one of said resonators being tuned to a frequency slightly higher and the other being tuned to a frequency slightly lower than the desired frequency, shielded detectors coupled to the latter resonators respectively, and means connected to said detectors and including an amplifier for applying a unidirectional biasing potential to said anode to maintain the frequency of said oscillations constant.

JOHN P. KINZER.

REFERENCES CITED

The following references are of record in the file of this patent:

UNITED STATES PATENTS

| Number | Name | Date |
|---|---|---|
| 2,250,532 | Hansell | July 29, 1941 |
| 2,294,942 | Varian et al. | Sept. 8, 1942 |
| 2,337,214 | Tunick | Dec. 21, 1943 |
| 2,374,810 | Fremlin | May 1, 1945 |
| 2,404,568 | Dow | July 23, 1946 |
| 2,406,850 | Pierce | Sept. 3, 1946 |
| 2,413,939 | Benware | Jan. 7, 1947 |
| 2,420,264 | Rost et al. | May 6, 1947 |
| 2,423,508 | Leck | July 8, 1947 |
| 2,434,917 | Fuchs | Jan. 27, 1948 |